United States Patent Office 3,578,461

Patented May 11, 1971

3,578,461

PROCESS FOR THE PREPARATION OF PROTEINACEOUS MATERIALS

Lloyd E. Weeks, Creve Coeur, and Bernard S. Wildi, Kirkwood, Mo., assignors to Monsanto Company, St. Louis, Mo.

No Drawing. Filed Dec. 12, 1968, Ser. No. 783,408
Int. Cl. A23j *3/00*
U.S. Cl. 99—7 12 Claims

ABSTRACT OF THE DISCLOSURE

An edible proteinaceous material having nutritional value is prepared by digesting non-edible protein materials from domestic animals, for example, feathers, in a liquid medium comprising water and an enzyme selected from the group consisting of alkaline protease, neutral protease and mixtures of said enzymes. Optionally a reductive-type disulfide splitting agent as exemplified by mercaptoethanol may be included. The procedure is typically carried out at a temperature in the range of from about 10° to about 70° C. The proteinaceous material is useful in animal feed compositions.

BACKGROUND OF THE INVENTION

Field of the invention

This invention relates to a process for preparing an edible and nutritious proteinaceous material. In a particular aspect, this invention relates to a process for preparing an edible and nutritious proteinaceous material from non-edible protein materials, by subjecting said protein material to the digestive action of a liquid medium comprising water, and an enzyme selected from the group consisting of neutral protease, alkaline protease and mixtures of said enzymes. In a further aspect, this invention relates to a process for preparing an edible and a nutritious proteinaceous material from non-edible protein materials, by subjecting said protein materials to the digestive action of a liquid medium comprising water, a reductive-type disulfide splitting agent and an enzyme selected from the group consisting of neutral protease, alkaline protease and mixtures of said enzymes.

Description of the prior art

The economic need for the utilization of non-edible protein-containing waste products, such as feathers, nails, hair and offal, obtained in the processing of domestic animals is well recognized. Toward this end various procedures for the conversion of such non-edible protein materials to edible form have been provided by the prior art with varying degrees of success. Such processes in the main require the use of temperatures in excess of 100° C. the use of lime (calcium oxide) or combinations of these in order to digest the non-edible material and thereby convert it to an edible form. One suggested procedure involves the use of pepsin or trypsin enzymes, preferably in the presence of steam. Another procedure involves heating keratinaceous materials such as feathers in a liquid comprising water, a lower-aliphatic alcohol, such as ethanol, and a reductive-type disulfide splitting agent, such as mercaptoethanol, at elevated temperatures. The use of such temperatures and/or the use of lime tends to degrade certain nutritionally important amino acids, such as cystine, isoleucine, threonine, serine and arginine. Thus by such procedures, a valuable portion of the nutritional value potentially present in the protein material is lost.

SUMMARY OF THE INVENTION

It is an object of the present invention to provide a process for preparing an edible proteinaceous material, rich in nutritionally valuable amino acids.

It is a further object of the present invention, to provide a process for preparing an edible and nutritious proteinaceous material from non-edible protein obtained from domestic animals, which process does not adversely affect the nutritional value of the proteinaceous material.

It is a still further object of the present invention, to provide an edible and nutritious proteinaceous material from non-edible proteins obtained from domestic animals, which can serve as a highly nutritious source of protein for animals.

Other objects and advantages of the present invention will be apparent in the specification and appended claims.

The present invention resides in the discovery that non-edible protein materials obtained from domestic animals are converted to an edible proteinaceous material without degradation of amino acids by subjecting the protein material to the action of a liquid digestive medium comprising water, and an enzyme selected from the group consisting of neutral protease, alkaline protease and mixtures thereof, for a period of time and at a temperature sufficient to digest the protein material. It is preferred to include in the liquid medium, a reductive-type disulfide splitting agent.

DETAILED DESCRIPTION

The liquid digestive medium employed in the process of the present invention comprises water and an enzyme selected from the group consisting of alkaline protease, neutral protease, and mixtures of said enzymes. As previously indicated, the liquid digestive medium preferably contains a reductive-type disulfide splitting agent (hereinafter sometimes referred to as "reducing agent"). Use of the reducing agent is preferred since it unexpectedly shortens digestion time. Other compatible materials such as buffering agents and surfactants may be included in the liquid digestive medium if desired. The liquid digestive medium may be prepared by any suitable procedure, as for example, by mixing the enzyme and the reducing agent in water. The concentrations of enzyme and reducing agent in the liquid digestive medium may vary over a wide range and any suitable concentrations may be employed. Typically, the medium is a dilute aqueous solution containing from about 0.1 to about 5.0% by weight of each of the reducing agent and enzyme. The ratio of reducing agent to enzyme may also vary over a wide range with a weight ratio of reducing agent to enzyme in the range of from about 10:1 to about 1:5 being typically employed. A ratio of reducing agent to enzyme of in the range of from about 3:1 to about 1:1 is generally preferred.

The enzyme employed in the process of the present invention is a protease enzyme selected from the group consisting of neutral protease, alkaline protease and mixtures thereof. The enzyme may be in any suitable form, however, it is preferred that the enzyme be readily soluble in water. Protease enzymes are known to the art and are obtained by cultivating a protease enzyme producing microorganism in a nutrient fermentation medium. Examples of microorganisms used in the preparation of protease enzymes include protease-enzyme producing microorganisms of the Bacillus, Aspergillus and Streptomyces genera such as for example *Bacillus subtilis, Aspergillus oryzae* and *Streptomyces griceus.* A particular strain of microorganism used in the preparation of mixtures of neutral protease and alkaline protease is a mutant strain of *Bacillus subtilis* described in U.S. Pat. 3,031,380. A culture of this organism is deposited in the culture collection of the United States Department of Agriculture, Agricultural Service, Northern Utilization Division, Peoria, Ill., and is available to the public. Most protease-enzyme producing microorganisms yield a mixture of neutral protease and alkaline protease. If it is desired to employ either enzyme individually, the enzyme of choice may be separated from the mixture by any suitable procedure. Enzyme separation methods are known in the art and include chromotography and ion exchange separation procedures.

Any suitable reductive-type disulfide splitting agent (reducing agent) may be used in the process of the present invention. Such reducing agents are known to the art and include mercaptoethanol, sodium sulfite, sodium sulfide, potassium sulfite, sodium hydrosulfite, potassium hydrosulfite, sodium metabisulfite, zinc chlorobenzoate, hydrogen sulfide, cystine, thioglycollic acid, mixtures of the foregoing and the like. Because of the excellent results obtained therewith, mercaptoethanol, sodium sulfite and mixtures thereof are preferred in the process of the present invention.

Any suitable non-edible protein material obtained from domestic animals may be used in the process of the present invention. Such materials typically include keratinaceous materials such as hair, nails and feathers from chickens, turkeys, hogs, cattle and the like and other non-edible protein materials obtained, for example, from the butchering of domestic animals, such as blood, entrails, lungs, etc. and the like. It is preferred, in order to shorten digestion time, that the non-edible protein material be first chopped, ground, or otherwise converted to small, uniform particles.

In carrying out the process of the present invention, the non-edible protein material is subjected to the action of the liquid digestive medium, at a temperature and for a period of time sufficient to digest the protein material, but insufficient to cause substantial degradation of amino acids. Temperatures in the range of from about 10° to about 70° C. are typically employed in the process, with temperatures in the range of from about 25° to about 55° C. being preferred. Temperatures above about 70° C. tend to cause degradation of valuable amino acids and, therefore, should be avoided especially for extended periods of time. While temperatures below about 10° C. may be employed, such temperatures are generally not practical because of the slow rate of digestion of the portein material. Complete digestion is typically accomplished in from about one to about 20 hours. It is preferred that the pH of the medium be not in excess of about 8 and espeically preferred that the pH be in the range of from about 5 to about 7. If desired, the time of digestion can be shortened by treatment of the protein material with, for example, steam or alcohol, prior to treatment with enzyme. The pretreatment preferably should not be of such duration as to permit substantial degradation of amino acids. A short pretreatment with steam is particularly preferred since it serves most satisfactorily to sterilize the protein material. While it is convenient and preferred that the reducing agent be included with the enzyme in the liquid digestive medium, if desired, the protein material can be subjected to treatment with an aqueous medium containing reducing agent, either prior or subsequent to treatment with enzyme.

The digested proteinaceous material produced in accordance with the present invention can be recovered from the liquid medium by any suitable procedure. For example, the proteinaceous material can be recovered by spray-drying, oven-drying or by simple evaporation. The proteinaceous material may also be recovered by precipitation, as for example, with a salt, such as magnesium sulfate in the known manner. The recovered material may be incorporated into an animal feed composition and serves as a source of protein in the feed. If desired, the liquid medium containing the digested protein may be adsorbed, as for example, by spraying onto an absorbent edible carrier having nutritional value, and then fed directly to the animal. Examples of suitable carriers include soy grits, wheat middlings, corn meal, fish meal, ground corn cobs, etc. and the like. The liquid medium may also be dried, as for example, by evaporation, and then fed directly to the animal.

The invention will be understood more fully by reference to the following specific examples. It is understood that the examples are presented for the purpose of illustration only and are not intended as a limitation of the invention.

EXAMPLE 1

A solution was prepared by mixing 0.2 gram of mercaptoethanol, 0.1 g. sodium sulfite and 0.0125 g. of a mixture of alkaline protease and neutral protease in 10 ml. of water. The enzyme mixture was shown by assay to contain $1.327 \times 10^6$ protease units per gram and $0.219 \times 10^6$ alkaline protease units per gram. To the resulting solution was added 0.1 g. of ground chicken feathers of particle size sufficient to pass a 30-mesh screen. The resulting mixture was gently heated at approximately 37° C. with agitation. Digestion as evidenced by solubilization of the feathers was complete after two hours.

A proteinaceous material rich in nutritionally valuable amino acids and useful as a source of protein in animal feeds is obtained.

EXAMPLE 2

A solution was prepared by mixing 0.2 g. of mercaptoethanol, 0.1 g. sodium sulfite and 0.0100 g. of neutral protease in 10 ml. of water. To the solution was added 0.1 g. of ground chicken feathers of particle size sufficiently small to pass a 30-mesh screen. The resulting mixture was gently heated at approximately 37° C. with agitation. Digestion of the feathers was complete after two hours.

EXAMPLE 3

A solution was prepared by mixing 0.2 g. of mercaptoethanol, 0.1 g. sodium sulfite, and 0.0100 g. of alkaline protease in 10 ml. of water. To this solution was added 1 g. of ground chicken feathers of particle size sufficiently small to pass a 30-mesh screen. The resulting mixture was gently heated at approximately 37° C. with agitation. Digestion of the feathers was complete in approximately two hours.

EXAMPLE 4

A solution was prepared by mixing 0.0125 g. of a mixture of alkaline protease and neutral protease in 10 ml. of water. To the solution was added 0.1 g. of ground chicken feathers of particle size sufficient to pass a 30-mesh screen. The resulting mixture was gently heated at approximately 37° C. with agitation. Digestion of the feathers was effected in approximately sixteen hours.

EXAMPLE 5

The procedure of Example 1 is repeated in all essential details with the exception that sodium sulfite is not included in the solution. Digestion of the feathers is effected.

EXAMPLE 6

The procedure of Example 1 is repeated in all essential details with the exception that mercaptoethanol is not included in the solution. Digestion of the feathers is effected.

EXAMPLE 7

The procedure of Example 1 is repeated in all essential details with the exception that zinc chlorobenzoate is substituted for mercaptoethanol and sodium sulfite, to digest the feathers.

EXAMPLE 8

The procedure of Example 1 is repeated in all essential details with the exception that hair obtained from hogs is substituted for chicken feathers. An edible proteinaceous material is obtained.

EXAMPLE 9

The procedure of Example 1 is repeated in all essential details with the exception that offal obtained from the butchering of cattle is substituted for chicken feathers. An edible proteinaceous material is obtained.

It is apparent that other reducing agents may be employed in the process of the present invention, and such materials are considered equivalents of the subject matter sought to be patented.

Since many embodiments of this invention may be made and since many changes may be made in the embodiments described, the foregoing is to be interpreted as illustrative only and the invention is defined by the claims appended hereto.

We claim:

1. A process for the preparation of an edible and digestible proteinaceous material rich in nutritionally valuable amino acids and useful in animal feed compositions which comprises subjecting non-edible protein material obtained from domestic animals to the action of a liquid medium consisting essentially of water, an enzyme selected from the group consisting of neutral protease, alkaline protease and mixtures thereof, and a disulfide splitting agent, the pH of the said mixture being from about 5 to about 8, at a temperature from about 10° to about 70° C. and for a period of time sufficient to digest the protein material, the temperature and the time at said temperature being limited to avoid substantial degradation of amino acids.

2. The process of claim 1 wherein the enzyme is a mixture of alkaline protease and a neutral protease.

3. The process of claim 1 wherein the enzyme is neu tral protease.

4. The process of claim 1 wherein the enzyme is alkaline protease.

5. The process of claim 1 wherein the disulfide splitting agent is sodium sulfite.

6. The process of claim 1 wherein the disulfide splitting agent is mercaptoethanol.

7. The process of claim 1 wherein the disulfide splitting agent is a mixture of mercaptoethanol and sodium sulfite.

8. The process of claim 1 wherein the temperature is in the range of from about 10° to about 70° C.

9. The process of claim 1 wherein the liquid medium contains from about 0.1 to about 5.0% by weight of enzyme and from about 0.1 to about 5.0% by weight of disulfide splitting agent.

10. The process of claim 1 wherein the weight ratio of disulfide splitting agent to enzyme is in the range of from about 10:1 to about 1:5.

11. The process of claim 1 wherein the non-edible protein material is a keratinaceous material.

12. The process of claim 11 wherein the keratinaceous material is feathers.

References Cited

UNITED STATES PATENTS

| | | | |
|---|---|---|---|
| 2,158,499 | 5/1939 | Grassmann et al. | 260—123.7 |
| 2,322,313 | 6/1943 | Phillips et al. | 195—29X |
| 2,814,851 | 12/1957 | Hervey | 260—123.7 |
| 2,857,317 | 10/1958 | Grimm | 195—6 |
| 2,952,586 | 9/1960 | Okunuki et al. | 195—66 |

FOREIGN PATENTS

| | | | |
|---|---|---|---|
| 29,673 | 10/1930 | Australia | 195—6 |

NORMAN YUDKOFF, Primary Examiner

F. E. DRUMMOND, Assistant Examiner

U.S. Cl. X.R.

99—2, 18; 195—5; 260—534